US011492028B1

(12) United States Patent
    Watts

(10) Patent No.: US 11,492,028 B1
(45) Date of Patent: Nov. 8, 2022

(54) TRACK DOLLY TO MOUNT A CAMERA AND OTHER ACCESSORIES

(71) Applicant: Titus Gadwin Watts, San Francisco, CA (US)

(72) Inventor: Titus Gadwin Watts, San Francisco, CA (US)

(*) Notice: Subject to any disclaimer, the term of this patent is extended or adjusted under 35 U.S.C. 154(b) by 394 days.

(21) Appl. No.: 16/715,256

(22) Filed: Dec. 16, 2019

Related U.S. Application Data

(60) Provisional application No. 62/745,868, filed on Oct. 15, 2018.

(51) Int. Cl.
*F16M 11/42* (2006.01)
*B62B 3/00* (2006.01)
*B62B 5/00* (2006.01)
*B66F 11/04* (2006.01)
*B62B 5/04* (2006.01)
(Continued)

(52) U.S. Cl.
CPC .............. *B62B 3/001* (2013.01); *B62B 3/008* (2013.01); *B62B 5/00* (2013.01); *B62B 5/04* (2013.01); *F16M 11/42* (2013.01); *B62B 2301/044* (2013.01); *B62B 2301/06* (2013.01); *B62D 1/00* (2013.01); *B62D 7/00* (2013.01); *B66F 11/048* (2013.01); *F16H 7/02* (2013.01); *F16H 7/06* (2013.01); *F16M 11/18* (2013.01); *F16M 11/425* (2013.01); *F16M 2200/00* (2013.01)

(58) Field of Classification Search
CPC .. B62D 1/10; B62D 7/00; G03B 19/00; B66F 11/048; F16M 11/42; F16M 2200/00; F16M 2200/068; F16M 11/18; B62B 3/008; B62B 5/00; B62B 5/04; B62B 2301/004; B62B 2301/06
USPC ................................... 280/47.11, 98, 99, 103
See application file for complete search history.

(56) References Cited

U.S. PATENT DOCUMENTS 2,834,605 A * 5/1958 McCollough ............ B62D 7/02
                                                      280/47.11
3,018,116 A * 1/1962 Summers ............... B66F 11/048
                                                         474/86
(Continued)

OTHER PUBLICATIONS

Greg and Christine Zaryk, The Colortran Mini Crab Dolly, Oct. 24, 2017, blogspot.com/2017/10/the-colortran-mini-crab-dolly.html.
(Continued)

*Primary Examiner* — Tan Le
(74) *Attorney, Agent, or Firm* — Plager Schack LLP; Mark H. Plager; Eric Liou

(57) ABSTRACT

A track dolly to mount a camera and accessories thereon is provided. The track dolly includes a steering mechanism to enhance directional control of the dolly when in motion. The track dolly includes a plate, at least one rail coupled to the plate and designed to permit attachment of the camera or accessories thereto, a plurality of wheels rotatably mounted to the plate, a handle rotatably mounted to the plate, and a plurality of linkage members adjustably mounted to the bottom surface of the plate and operably connected to the handle. The linkage members are operably connected to any number of the plurality of wheels. The handle is maneuvered to permit the plurality of linkage members to rotatably adjust any number of the plurality of wheels relative to the plate, thereby adjusting the directional control of the dolly.

1 Claim, 16 Drawing Sheets

(51) Int. Cl.
   *F16H 7/06* (2006.01)
   *F16H 7/02* (2006.01)
   *F16M 11/18* (2006.01)
   *B62D 1/00* (2006.01)
   *B62D 7/00* (2006.01)

(56) References Cited

U.S. PATENT DOCUMENTS

| | | | | |
|---|---|---|---|---|
| 3,297,337 | A * | 1/1967 | Sargent | F16M 11/42 180/410 |
| 4,257,619 | A * | 3/1981 | Fisher | B62D 7/04 280/91.1 |
| 4,950,126 | A * | 8/1990 | Fabiano | B66F 11/048 280/47.11 |
| 5,730,450 | A * | 3/1998 | Chapman | F16M 11/42 280/47.11 |
| 5,820,088 | A | 10/1998 | Chapman | |
| 6,135,465 | A * | 10/2000 | Chapman | B66F 11/048 280/47.11 |
| 6,719,307 | B1 | 4/2004 | Chapman | |
| 7,037,006 | B2 * | 5/2006 | Chapman | F16M 11/42 396/428 |

OTHER PUBLICATIONS

Dutti Dolly by Matthews—Gear Review—Hurlbut Academy, Apr. 19, 2017, Shane Hurlbut Hurlbut Visuals, https://www.hurlbutacademy.com/matthews-dutti-dolly/.

* cited by examiner

TRACK DOLLY TO MOUNT A CAMERA AND OTHER ACCESSORIES

RELATED APPLICATION

The application claims priority to provisional patent application U.S. Ser. No. 62/745,868 filed on Oct. 15, 2018, the entire contents of which is herein incorporated by reference.

BACKGROUND

The embodiments herein relate generally to track dollies. More specifically, embodiments of the invention are directed to a track dolly that mounts a camera or other accessories thereon.

Track dollies such as Matthews Studio Equipment's Dutti Dolly and Colortran's Mini Crab Dolly are commonly used by cinematographers and other professionals on set to mount a camera during the production of film or television works. The Dutti Dolly comprises a plate with a series of wheels that travel along a rail. The camera is mounted to the top of the plate to capture low-shot video images as the dolly travels along the rail. Colortran's Mini Crab Dolly is a steering dolly that mounts a camera and rides on the ground. Other camera dolly mounting devices exist as disclosed in U.S. Pat. Nos. 6,719,307, 5,820,088 and 4,950,126.

These prior art dollies have various limitations. The Dutti Dolly is limited in that it does not have a steering mechanism to control the direction of the dolly along the ground when removed from a track. Further, the Dutti Dolly restricts the mounting of the camera or other accessories primarily to the center of the dolly. Colortran's Mini Crab Dolly is expensive and complex. Certain other prior art dollies in the field are undesirable because they are bulky and heavy, which make them difficult to maneuver during use. Other prior art dollies do not have a steering system that controls all wheels and are limited in the number and type of accessories that can be attached thereto.

As such, there is a need in the industry for a track dolly that addresses the limitations of the prior art, which effectively mounts a variety of cameras and other accessories thereon. There is a further need for the track dolly to have a steering mechanism that enhances directional control of the track dolly along the ground in the absence of a track.

SUMMARY

In certain embodiments of the invention, a track dolly for use to mount a camera and accessories thereon is provided. The track dolly comprises a steering mechanism to enhance directional control of the dolly when in motion. The track dolly comprises a plate comprising a top surface and a bottom surface, at least one rail coupled to the plate and configured to permit attachment of the camera or accessories thereto, a plurality of wheels rotatably mounted to the plate, a handle rotatably mounted to the top surface of the plate, and a plurality of linkage members adjustably mounted to the bottom surface of the plate and operably connected to the handle, the plurality of linkage members operably connected to any number of the plurality of wheels, wherein the handle is maneuvered to permit the plurality of linkage members to rotatably adjust any number of the plurality of wheels relative to the plate, thereby adjusting the directional control of the dolly.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

In certain embodiments of the invention as depicted in FIGS. 1-5, track dolly 10 is configured to mount camera 24 and a variety of accessories (not shown) thereon. Track dolly 10 is configured to travel directly on the ground or along a rail. In the former case, track dolly 10 comprises a steering mechanism that permits a user to steer the direction of the dolly as it travels along the ground.

Figure 1:
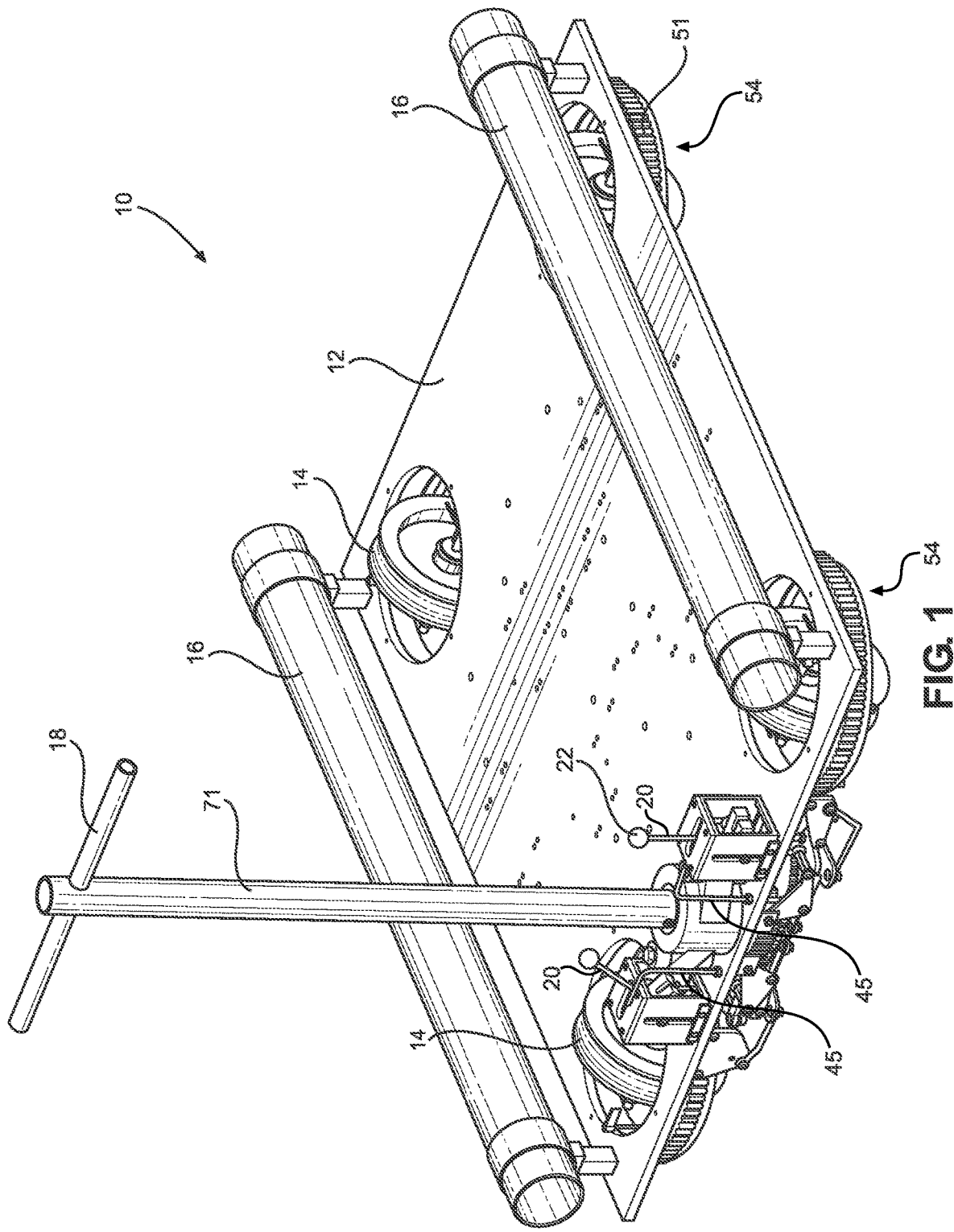
FIG. 1 depicts a perspective view of certain embodiments of the track dolly.
Figure 2:
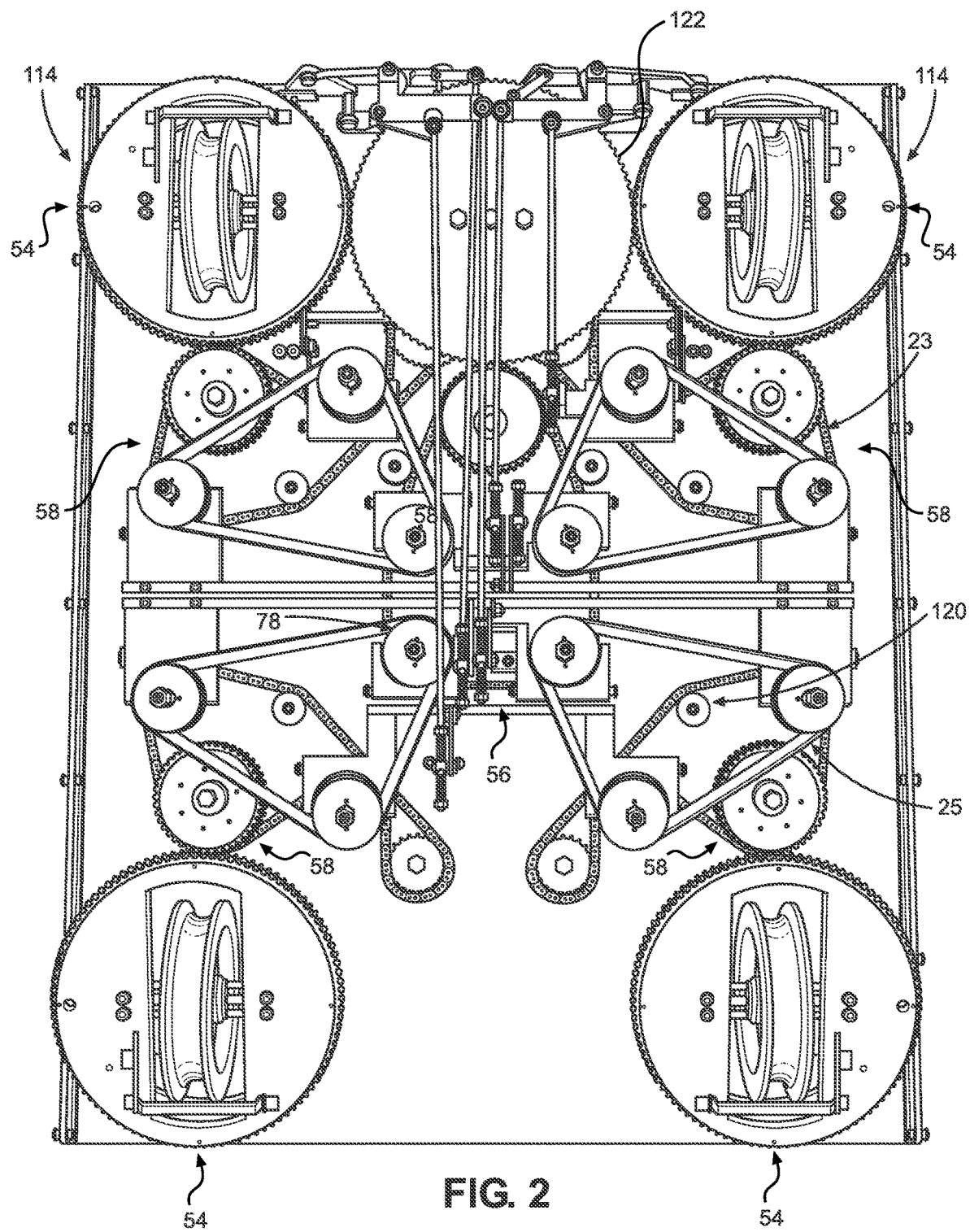
FIG. 2 depicts a bottom view of certain embodiments of the track dolly.
Figure 3:
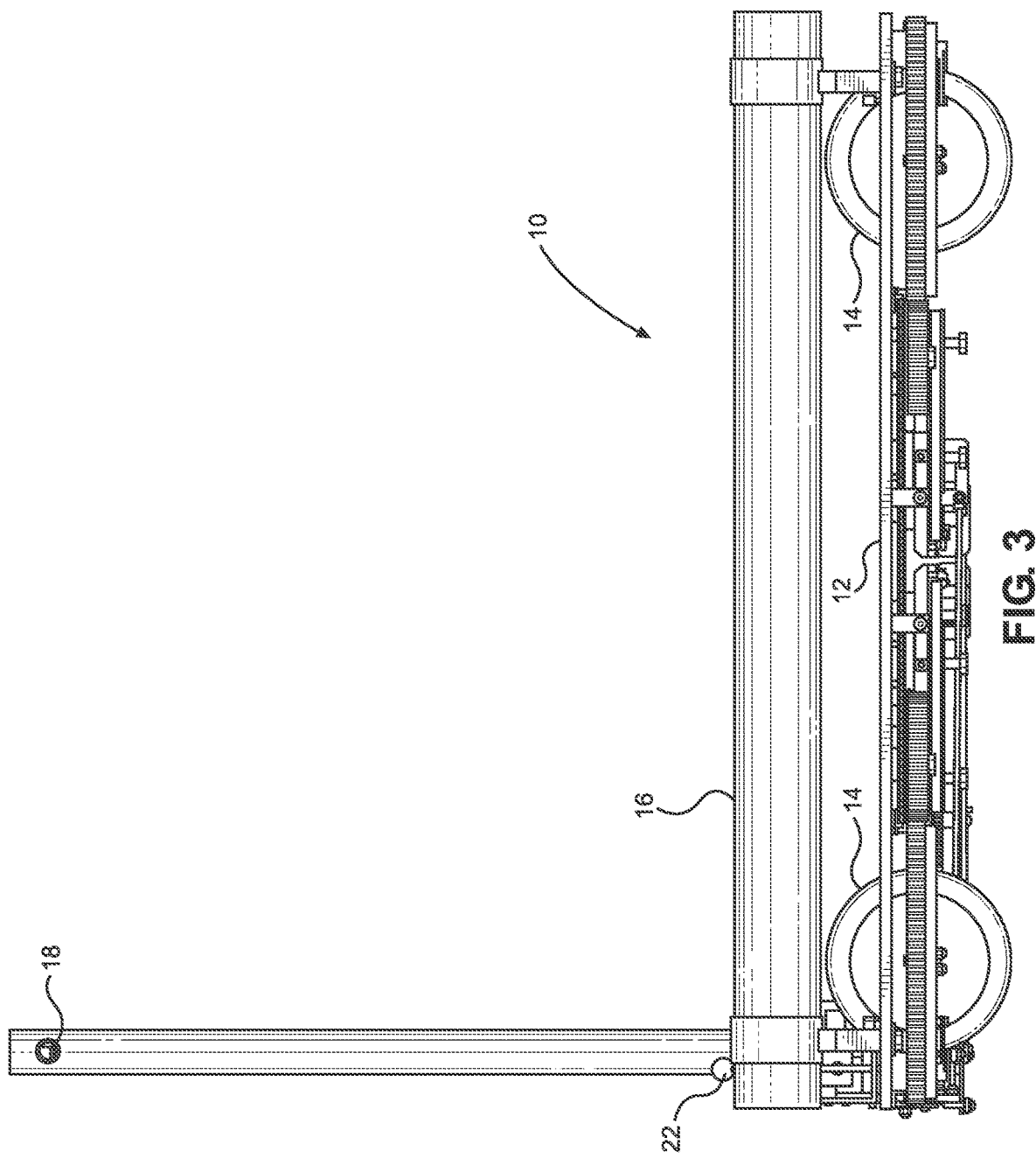
FIG. 3 depicts a side view of certain embodiments of the track dolly.

In certain embodiments as depicted in FIGS. 1-5, track dolly 10 generally comprises plate 12, wheels 14, rails 16, handle 18 and post 71. In one embodiment, these components of track dolly 10 are preferably made from aluminum. However, other materials such as steel, other metals or materials can be used in alternative embodiments. In one embodiment as depicted in FIGS. 1-2, post 71 is rotatably mounted to plate 12 and mechanically coupled to a plurality of linkage members beneath plate 12 including at least steering gear 122, center drive assembly 56, wheel drive assemblies 58 and wheel assemblies 54. These components of track dolly 10 will be described in more detail in the disclosure that follows.

Figure 6:
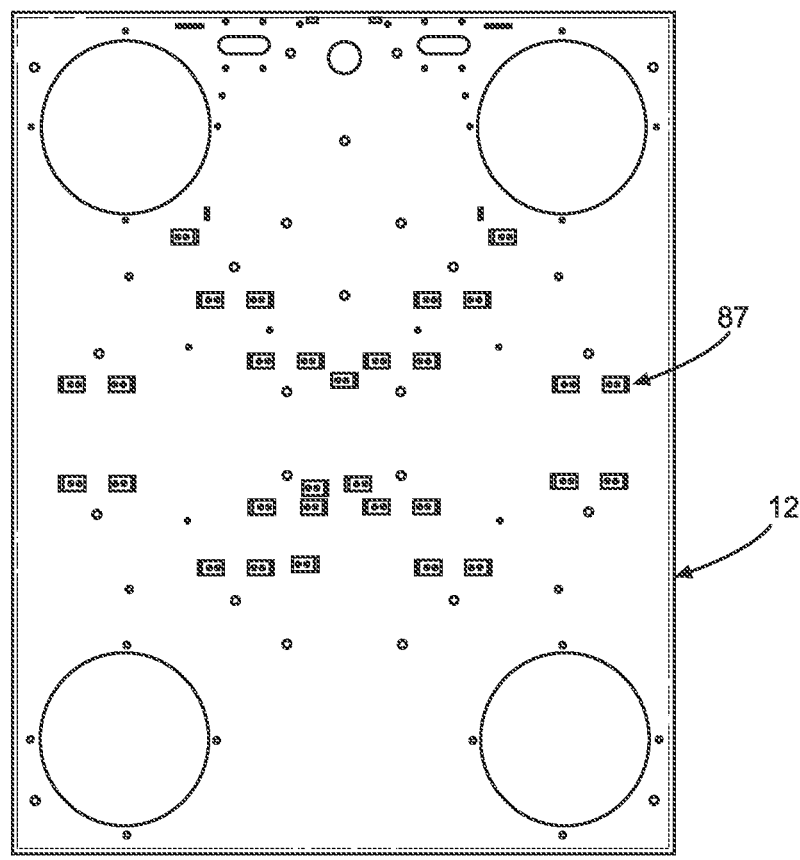
FIG. 6 depicts a bottom view of certain embodiments of the track dolly illustrating a plate.

In certain embodiments as depicted in FIGS. 1 and 6, plate 12 is an aluminum plate with approximate dimensions of 48"×38½"×½". However, the dimensions of plate 12 can vary. In one embodiment, plate 12 comprises four corner openings configured to mount four wheels 14. The four corner openings in plate 12 are configured to mount a first pair of wheel assemblies 54 corresponding to a pair of front wheels 14 and a second pair of wheel assemblies 54 corresponding to a pair of rear wheels 14. In an alternative embodiment, it shall be appreciated that plate 12 can be modified to mount any alternative number of wheels.

In one embodiment as depicted in FIGS. 1 and 3-5, a pair of rails 16 is coupled to opposing side edges of plate 12 and oriented generally parallel to a longitudinal axis of plate 12. Rails 16 can be mounted to plate 12 using any variety of mechanical fasteners. In one embodiment, each rail 16 comprises an aluminum pipe that is approximately 1½" in diameter and 4' in length. However, the dimensions of rails 16 can vary. In an alternative embodiment, any alternative number of rails 16 can be mounted to plate 12.

The pair of rails 16 is configured to permit the attachment of one or more cameras 24, equipment, seats or accessories using standard mounting components such as clamps, brackets, welds, other couplers and mechanical fasteners. The low-profile of rails 16 on plate 12 permits camera 24 to capture low angle images from track dolly 10.

Figure 4:
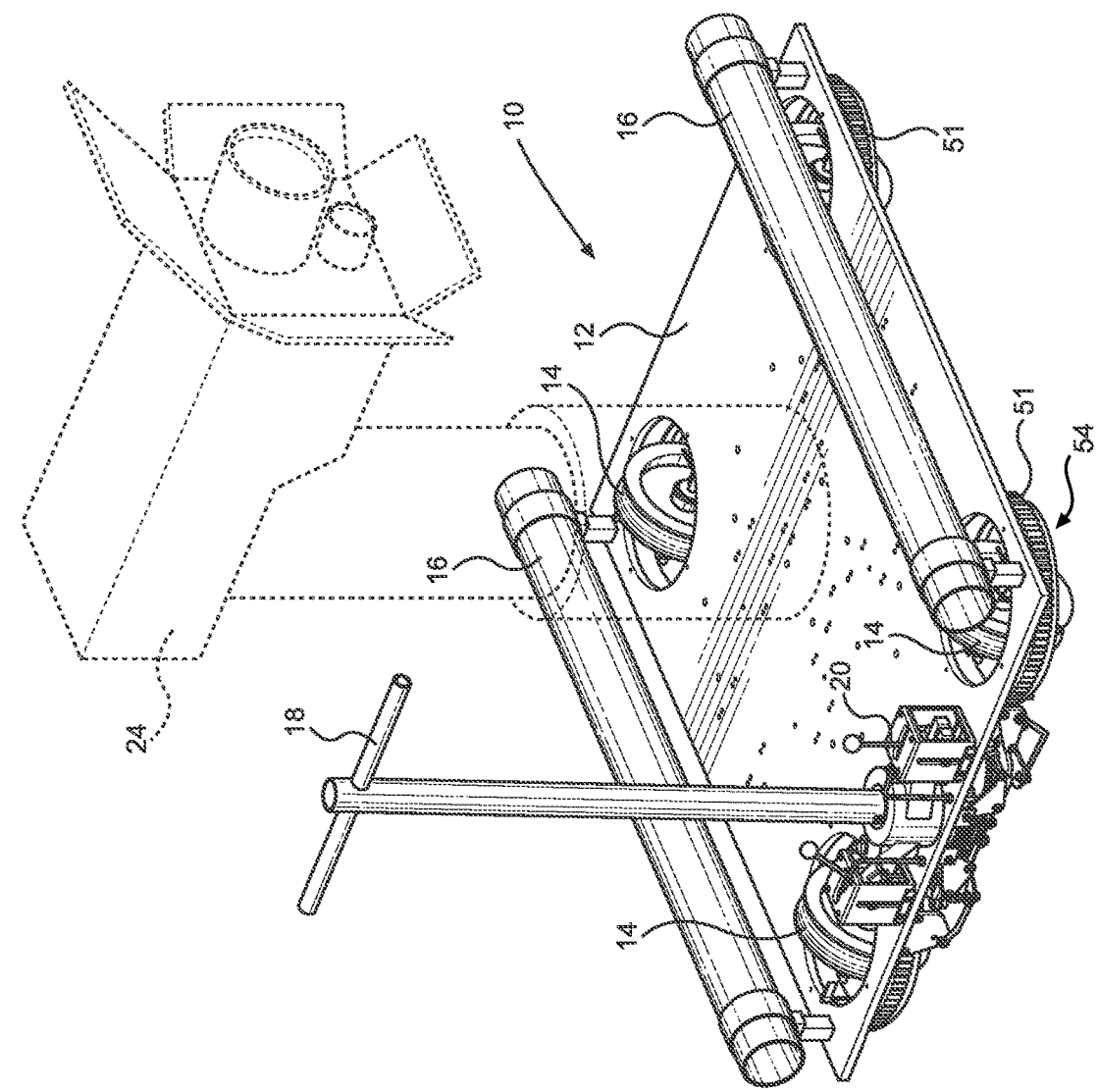
FIG. 4 depicts a perspective view of certain embodiments of the track dolly shown in use.

In an alternative embodiment as depicted in FIG. 4, camera 24 can be mounted to the center of plate 12 using mounting components such as clamps, brackets, other couplers and mechanical fasteners. Additional mounting components can be used to adjust the height and movement of the mounted camera above plate 12 of track dolly 10.

Figure 9:
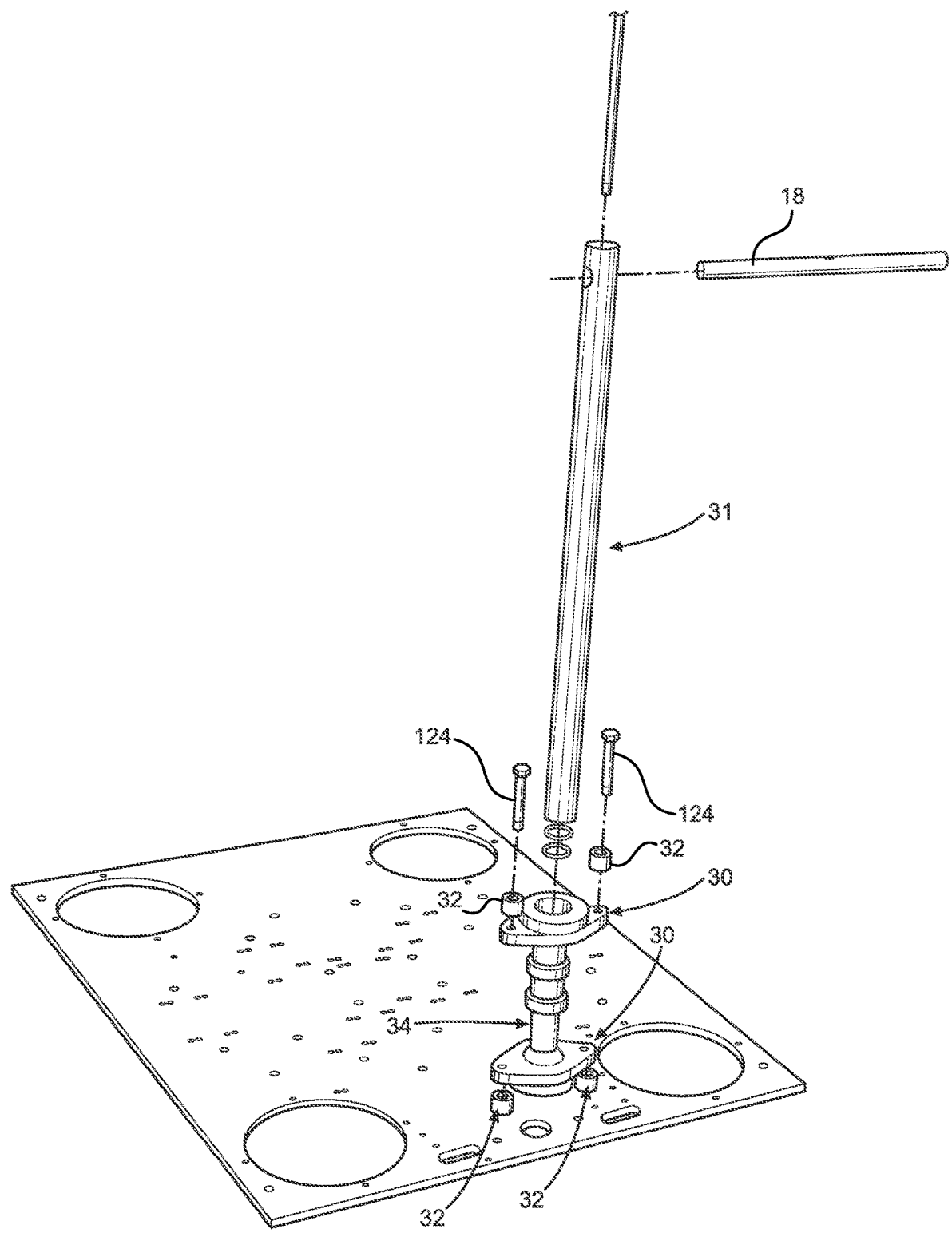
FIG. 9 depicts an exploded view of certain embodiments of the track dolly illustrating the plate and handle.
Figure 13:
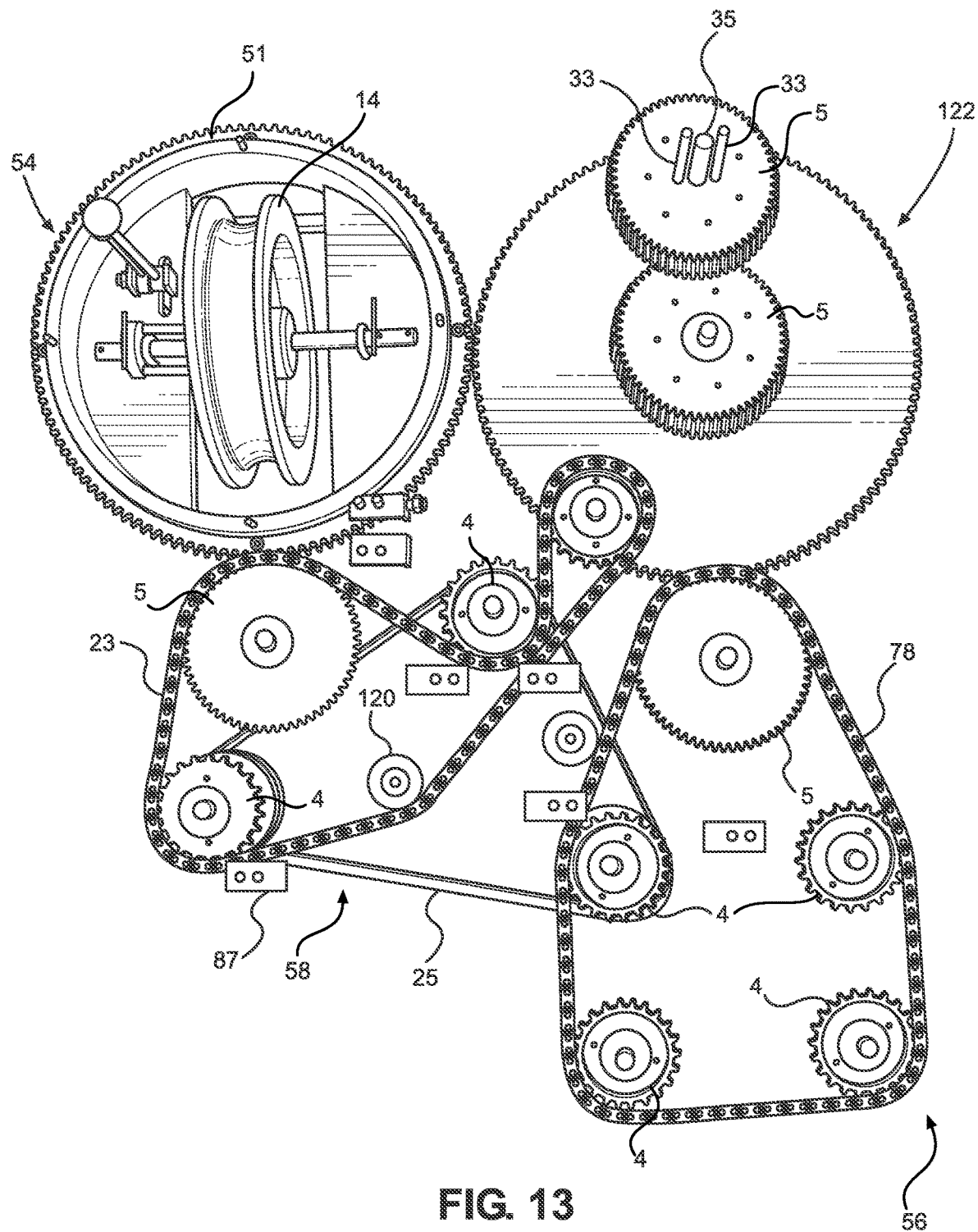
FIG. 13 depicts a top view of certain embodiments of the track dolly illustrating the connection of a wheel assembly, wheel drive assembly and center drive assembly.

In certain embodiments as depicted in FIGS. 1-2, 9 and 13, handle 18 and post 71 are coupled together to form T-bar 31. Handle 18 and post 71 are secured together by inserting a bolt through handle 18 that extends through the interior of post 71. As depicted in FIGS. 2, 9 and 13, T-bar 31 is rotatably mounted to plate 12 by mating pipe 34, a pair of steering bearing and housings 30, a pair of timing gear assemblies 5 and steering gear 122.

In one embodiment as depicted in FIG. 9, steering bearing and housings 30 are mounted on opposing ends of mating pipe 34 above plate 12. Post 71 of T-bar 31 is inserted through mating pipe 34. A pair of steering bearing bolts 124 extends through spacers 32 and the upper steering bearing and housing 30. As depicted in FIG. 13, a pair of timing gear assemblies 5 is coupled together and mounted to the bottom of plate 12. One of the timing gear assemblies 5 comprises a pair of T-bar bolts 33 that extends through plate 12, a pair of spacers 32 and the lower steering bearing and housing 30, and center bolt 35 that extends through plate 12 and engages with mating pipe 34.

As depicted in FIG. 13, timing gear assembly 5 with T-bar bolts 33 and center bolt 35 engages with another timing gear assembly 5, which is directly attached to steering gear 122. As will be described in more detail in the embodiments that follow, this connection allows the rotation of handle 18 to transfer through timing gear assemblies 5 and steering gear 122, center drive assembly 56 and any number of wheel drive assemblies 58 to rotate any number of wheels 14 of wheel assemblies 54. This allows the user to control the directional movement of track dolly 10 on the ground.

Figure 12:
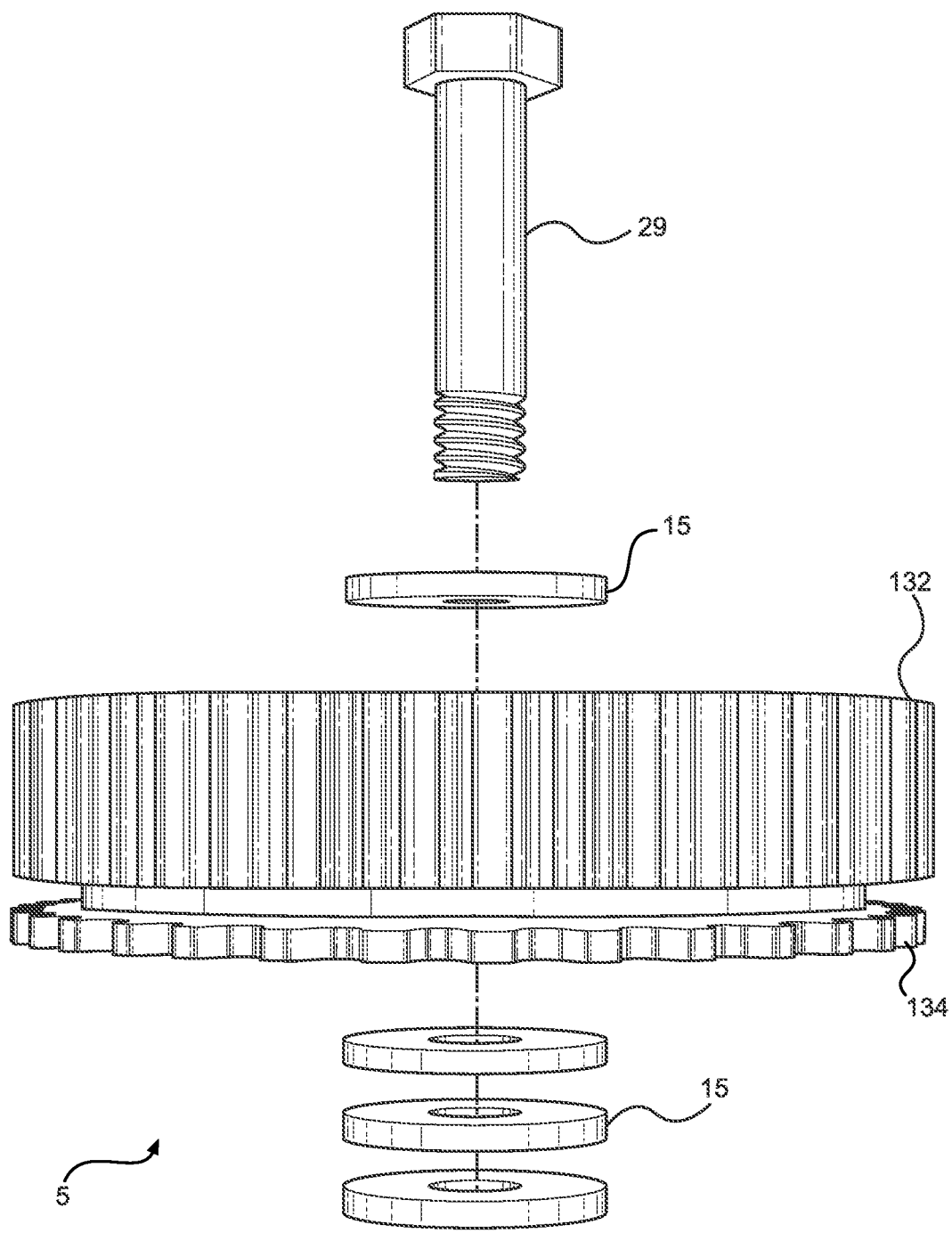
FIG. 12 depicts an exploded view of certain embodiments of the track dolly illustrating a timing gear assembly.

In one embodiment, timing gear assemblies 5 used in track dolly 10 are illustrated in FIG. 12. In this embodiment, each timing gear assembly 5 comprises upper gear 132 continuously connected to lower sprocket 134. Short bolt 29 is inserted through the center of upper gear 132, lower sprocket 134 and a series of washers 15.

Figure 10:
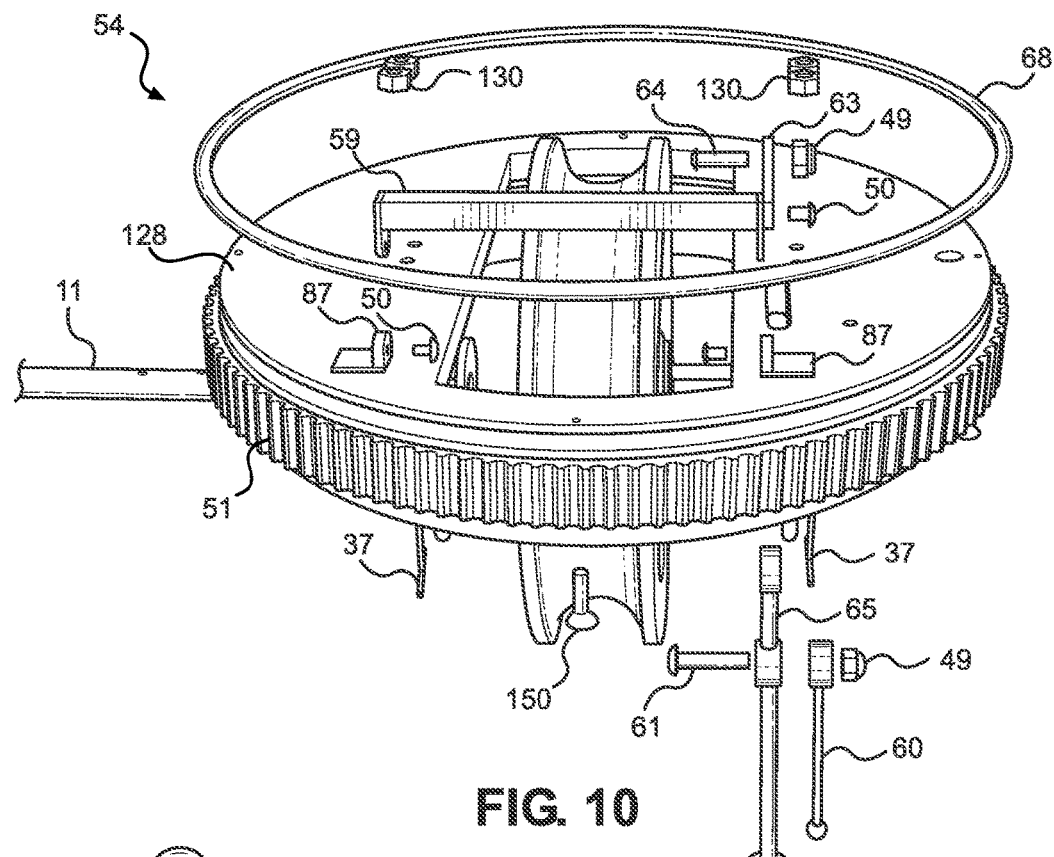
FIG. 10 depicts a bottom exploded view of certain embodiments of the track dolly illustrating a wheel assembly.
Figure 11:
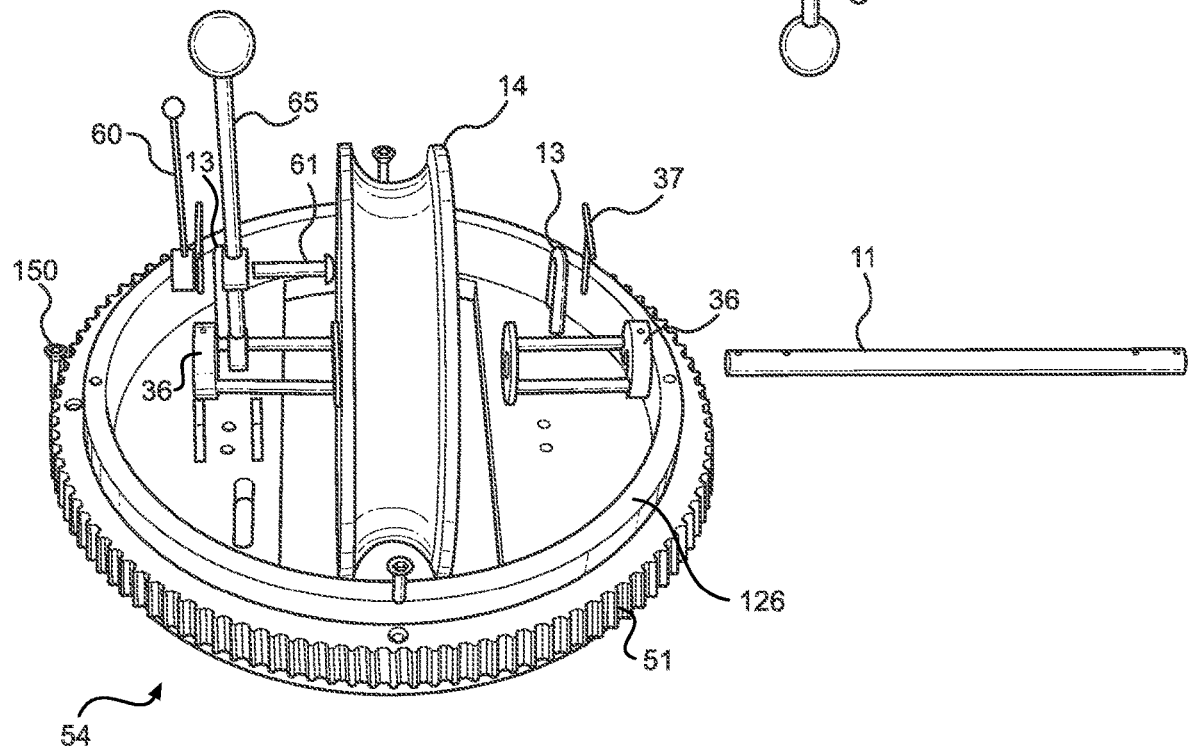
FIG. 11 depicts a top exploded view of certain embodiments of the track dolly illustrating the wheel assembly.

In certain embodiments as depicted in FIGS. 1-2, 6 and 10-11, each wheel assembly 54 is mounted to one of the corner openings in plate 12. In one embodiment as depicted in FIGS. 10-11, wheel assembly 54 generally comprises wheel 14, wheel gear 51, ring 126 and wheel gear plate 128. As depicted in FIG. 11, ring 126 is coupled to the top of wheel gear 51 and plate 12 by a plurality of fasteners such as screws.

Wheel gear 51 comprises a central opening that allows wheel 14 to pass therethrough. Wheel axle 11 is inserted through the center of wheel 14 and a pair of oppositely oriented wheel center locks 36. Wheel center locks 36 are coupled to wheel gear 51 by inserting a pair of lock pins 37 through wheel axle 11 and the pair of wheel center locks 36. As depicted in FIGS. 10-11, a pair of U-bolts 13 extends through wheel gear plate 128 and engages with corresponding U-bolt nuts 130 to enhance stability of wheel axle 11.

In one embodiment as depicted in FIG. 11, the pair of wheel center locks 36 can slide against or away wheel 14 depending on whether lateral movement of wheel 14 within the central opening of wheel gear 51 is desired. Wheel axle 11 comprises a pair of inner openings and a pair of outer openings to permit lock pins 37 to extend through to lock each wheel center lock 36 either against wheel 14 or away wheel 14.

This adjustment of wheel center locks 36 is important depending on whether track dolly 10 is disposed on or off a track. When track dolly 10 is disposed on the track, either both left wheels or both right wheels are adjusted with all wheel center locks 36 positioned against the pair of wheels 14. The remaining pair of wheels 14 on the other side of plate 12 (either the left wheels or right wheels) are adjusted with all wheel center locks 36 positioned away from wheels 14. This allows wheels 14 of track dolly 10 to accommodate turns on the track. When track dolly 10 is disposed on the ground, wheel center locks 36 are positioned against all wheels 14 on the left and right sides of plate 12 to enhance stability of the wheels.

In one embodiment as depicted in FIGS. 10-11, a brake is coupled to each wheel assembly 54, which comprises brake pad 59, brake linkage 63, brake lever shaft 65 and brake lock shaft 60. As depicted in FIG. 10, wheel gear plate 128 is coupled to the bottom of wheel gear 51 by a plurality of fasteners such as screws. O-ring 68 is disposed around wheel gear 51. Brake pad 59 is coupled to wheel gear plate 128 by L-brackets 87 and screws 50. L-brackets 87 can be fastened to wheel gear plate 128 using any type of mechanical fasteners, welds or other fasteners.

In one embodiment as depicted in FIGS. 10-11, brake lever shaft 65 extends through wheel gear 51 and wheel gear plate 128 and comprises an end that is coupled to brake linkage 63 by brake lever shaft bolt 64 and lock nut 49. This allows a user to manually maneuver brake lever shaft 65 at the top of plate 12 to engage or disengage brake pad 59 from the respective wheel 14 of wheel assembly 54. In one embodiment as depicted in FIGS. 10-11, brake lock shaft 60 is used to maintain brake lever shaft 65 in the brake engaged position or disengaged position. Brake lever bolt 61 is inserted through brake lever shaft 65 and brake lock shaft 60, and secured by lock nut 49 to maintain the brake in either the engaged or disengaged position.

In certain embodiments as depicted in FIGS. 2 and 13, rotational movement of handle 18 transfers through post 71, timing gear assemblies 5, steering gear 122, center drive assembly 56, any number of the plurality of wheel drive assemblies 58, and any of the corresponding wheel assemblies 54 to rotatably adjust the connected wheel(s) 14. For simplicity, the mechanical connections of these linkage members are illustrated for the control of a single front wheel 14 as illustrated in FIG. 13. It is noted that the connections of steering gear 122, center drive assembly 56 and the remaining wheel drive assemblies 58 for the remaining wheel assemblies 54 on track dolly 10 are the same.

In one embodiment as depicted in FIG. 13, center drive assembly 56 generally comprises timing gear assembly 5 and a plurality of sprocket gear assemblies 4. Each sprocket gear assembly 4 is configured to engage with one of the plurality of wheel drive assemblies 58 that corresponds to one of the plurality of wheel assemblies 54.

In this embodiment, upper gear 132 of timing gear assembly 5 engages with steering gear 122 and lower sprocket 134 engages with center chain 78. The plurality of sprocket gear assemblies 4 are coupled to center chain 78.

Figure 18:
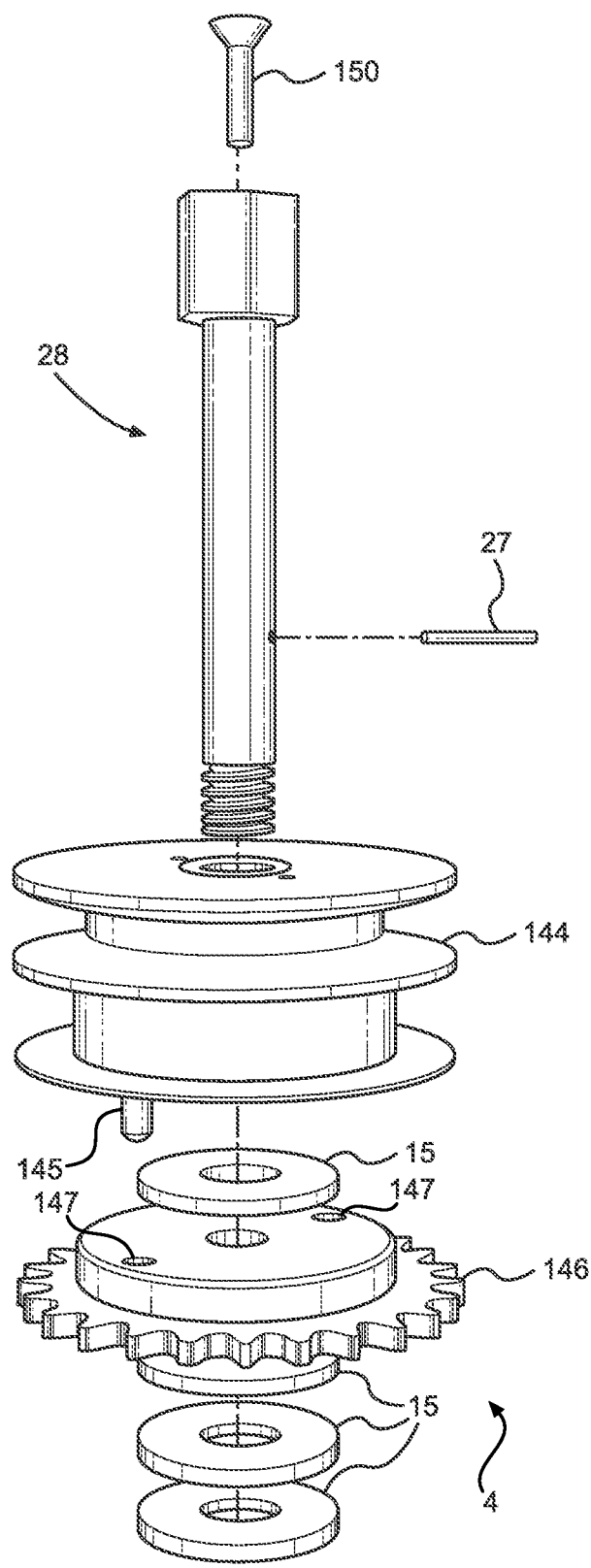
FIG. 18 depicts an exploded view of certain embodiments of the track dolly illustrating the sprocket gear assembly.

In one embodiment as depicted in FIG. 18, each sprocket gear assembly 4 generally comprises long bolt 28, pulley 144 and detachable sprocket 146. Pulley 144 and detachable sprocket 146 are coupled together by long bolt 28, carter pin 27, washers 15 and countersunk screw 150. In this configuration, long bolt 28 extends through pulley 144, detachable sprocket 146 and washers 15. In one embodiment, the bottom of pulley 144 comprises a pair of pins 145 that is configured to engage with the pair of sprocket openings 147 in detachable sprocket 146. With pins 145 engaged with sprocket openings 147 in detachable sprocket 146, pulley 144 and detachable sprocket 146 rotate together at the same speed.

As will be described in the embodiments that follow, a series of levers and pulleys are configured to control the engagement and disengagement of sprocket gear assemblies 4 in track dolly 10. Specifically, the engagement and disengagement of pins 145 in pulley 144 with sprocket openings 147 in detachable sprocket 146 for all sprocket gear assemblies 4 to adjust which wheel assemblies 54 are controlled by the rotation of handle 18.

In one embodiment as depicted in FIG. 13, detachable sprocket 146 of sprocket gear assembly 4 in center drive assembly 56 is engaged with center chain 78. Pulley 144 of sprocket gear assembly 4 in center drive assembly 56 is operably connected to wheel drive assembly 58 corresponding to wheel assembly 54. In one embodiment, wheel drive assembly 58 generally comprises V-belt 25, timing gear assembly 5, wheel chain 23, and at least one sprocket gear assembly 4.

V-belt 25 is engaged with pulley 144 of sprocket gear assembly 4 in center drive assembly 56 and pulleys 144 in any sprocket gear assemblies 4 in wheel drive assembly 58. Detachable sprockets 146 in any sprocket gear assemblies 4 in wheel drive assembly 58 are engaged with wheel chain 23. Lower sprocket 134 of timing gear assembly 5 in wheel drive assembly 58 is engaged with wheel chain 23. Upper gear 132 of timing gear assembly 5 in wheel drive assembly 58 is engaged with wheel gear 51 of wheel assembly 54. In one embodiment, chain tension pulley 120 is operably connected to wheel chain 23.

It shall be appreciated that alternative configurations of wheel drive assembly 58 are possible with a variable number of sprocket gear assemblies 4, timing gear assemblies 5, and the like. For simplicity and illustrative purposes, the rotating adjustment of wheel assembly 54 to swivel wheel 14 is described when the corresponding sprocket gear assembly 4 in center drive assembly 56 and one sprocket gear assembly 4 in wheel drive assembly 58 are in the engaged positions, e.g., pins 145 of pulleys 144 in sprocket gear assemblies 4 are engaged with sprocket openings 147 of detachable sprockets 146.

In this configuration as depicted in FIG. 13, the rotation of handle 18 transfers through post 71 to drive the connected timing gear assemblies 5 and steering gear 122. The rotating steering gear 122 drives center chain 78 and sprocket gear assemblies 4 in center drive assembly 56. The rotating sprocket gear assembly 4 in center drive assembly 56 drives the sprocket gear assembly 4 in wheel drive assembly 58 via V-belt 25. The rotating sprocket gear assembly 4 in wheel drive assembly 58 drives wheel chain 23, which drives timing gear assembly 5 in wheel drive assembly 58. The rotating timing gear assembly 5 in wheel drive assembly 58 drives wheel gear 51 of wheel assembly 54. This rotates wheel 14 in a swiveling motion up to 360 degrees based on the movement of handle 18.

It shall be appreciated that any of the wheel assemblies 54 of track dolly 10 can be rotatably adjusted via handle 18 in the same manner depending on whether sprocket gear assemblies 4 in center drive assembly 56 corresponding to the wheel assemblies 54 are engaged, e.g. pins 145 of pulleys 144 in sprocket gear assemblies 4 are engaged with sprocket openings 147 of detachable sprockets 146. If any sprocket gear assembly 4 in center drive assembly 56 is disengaged, e.g. pins 145 of pulley 144 in sprocket gear assembly 4 is disengaged with sprocket openings 147 of detachable sprocket 146, the rotation of handle 18 will not transfer to the corresponding wheel drive assembly 58 and wheel assembly 54.

In one embodiment as depicted in FIGS. 1 and 4, the engagement and disengagement of sprocket gear assemblies 4 in center drive assembly 56 are controlled by center drive assembly levers 45. The engagement and disengagement of sprocket gear assemblies 4 in wheel drive assemblies 58 are controlled by wheel drive assembly levers 20. As a result, center drive assembly levers 45 and wheel drive assembly levers 20 can be adjusted to different combinations of modes to allow the rotation of handle 18 to facilitate any of the following modes for wheel assemblies 54 on track dolly 10: (1) front and rear wheels 14 are free to move; (2) steering of front wheels 14 with rear wheels 14 locked; (3) steering of rear wheels 14 with front wheels 14 locked; (4) front and rear wheels 14 are steered simultaneously in the same direction; (5) front wheels 14 turn simultaneously in a first direction and rear wheels 14 turn simultaneously in the same direction that is opposite of the first direction; and (6) front and rear wheels 14 are locked.

In certain embodiments as depicted in FIGS. 1-2, 8 and 14-15, wheel drive assembly levers 20 are mechanically coupled to sprocket gear assemblies 4 in wheel drive assemblies 58 by a series of lever linkage members 44, which may comprise any components including, but not limited to arms, rods, bars, pivot components, L-brackets, angled linkage rods, couplers, and the like.

Figure 8:
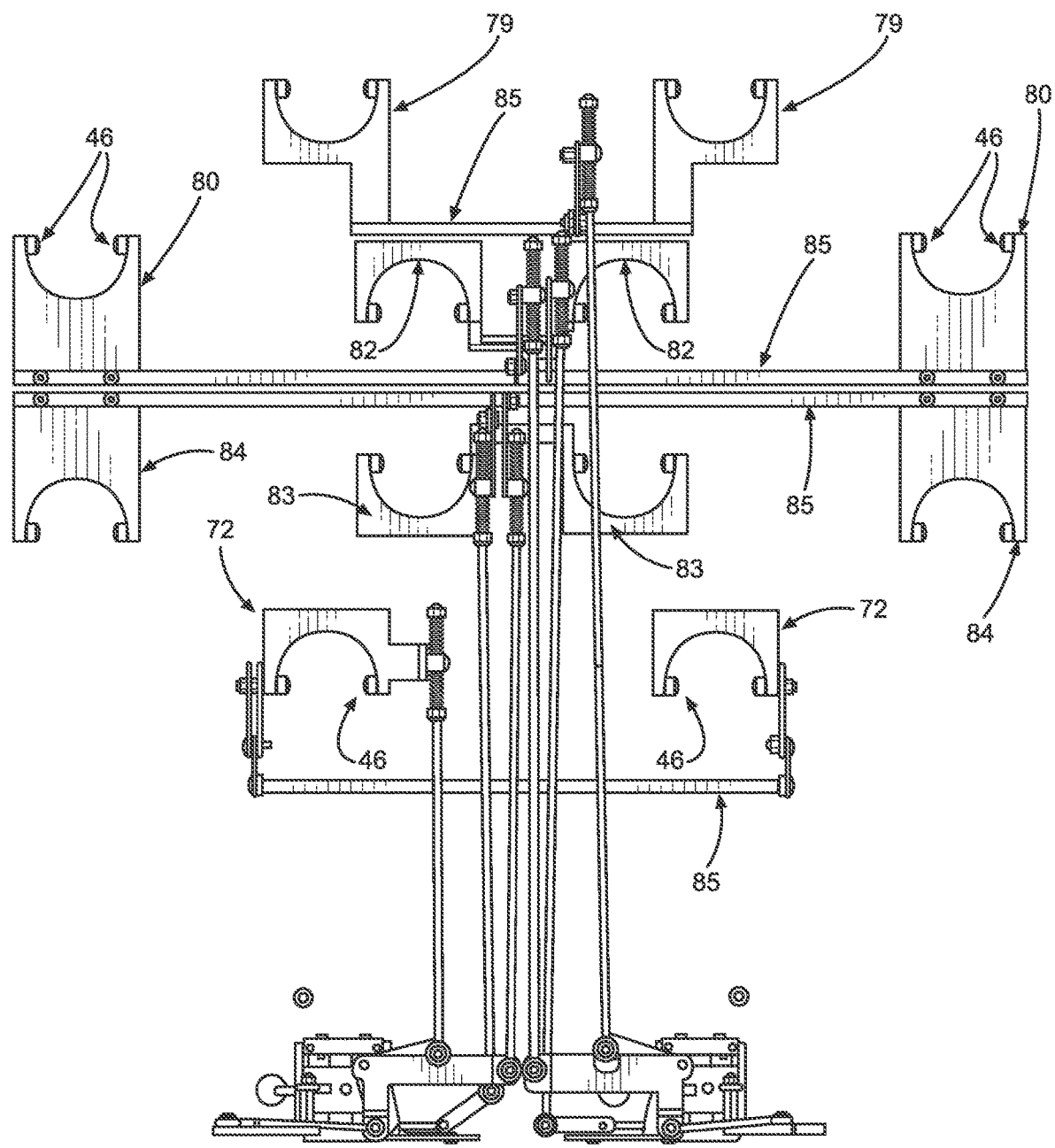
FIG. 8 depicts a bottom view of certain embodiments of the track dolly illustrating the plurality of levers.

In one embodiment as depicted in FIG. 8, a first wheel drive assembly lever 20 is coupled to first front wheel drive assembly pulley levers 72 and second front wheel drive assembly pulley levers 84 by lever linkage members 44, corresponding to sprocket gear assemblies 4 in wheel drive assemblies 58 associated with the front wheel assemblies 54. Similarly, a second wheel drive assembly lever 20 is coupled to first rear wheel drive assembly pulley levers 79 and second rear wheel drive assembly pulley levers 80 by lever linkage members 44, corresponding to sprocket gear assemblies 4 in wheel drive assemblies 58 associated with the rear wheel assemblies 54.

In one embodiment as depicted in FIG. 8, a first center drive assembly lever 45 is coupled to front wheel center drive assembly pulley levers 83 by lever linkage members 44, corresponding to a pair of sprocket gear assemblies 4 in center drive assembly 56 associated with the front wheel assemblies 54. Similarly, a second center drive assembly lever 45 is coupled to rear wheel center drive assembly pulley levers 82 by lever linkage members 44, corresponding to another pair of sprocket gear assemblies 4 in center drive assembly 56 associated with the rear wheel assemblies 54.

Figure 14:
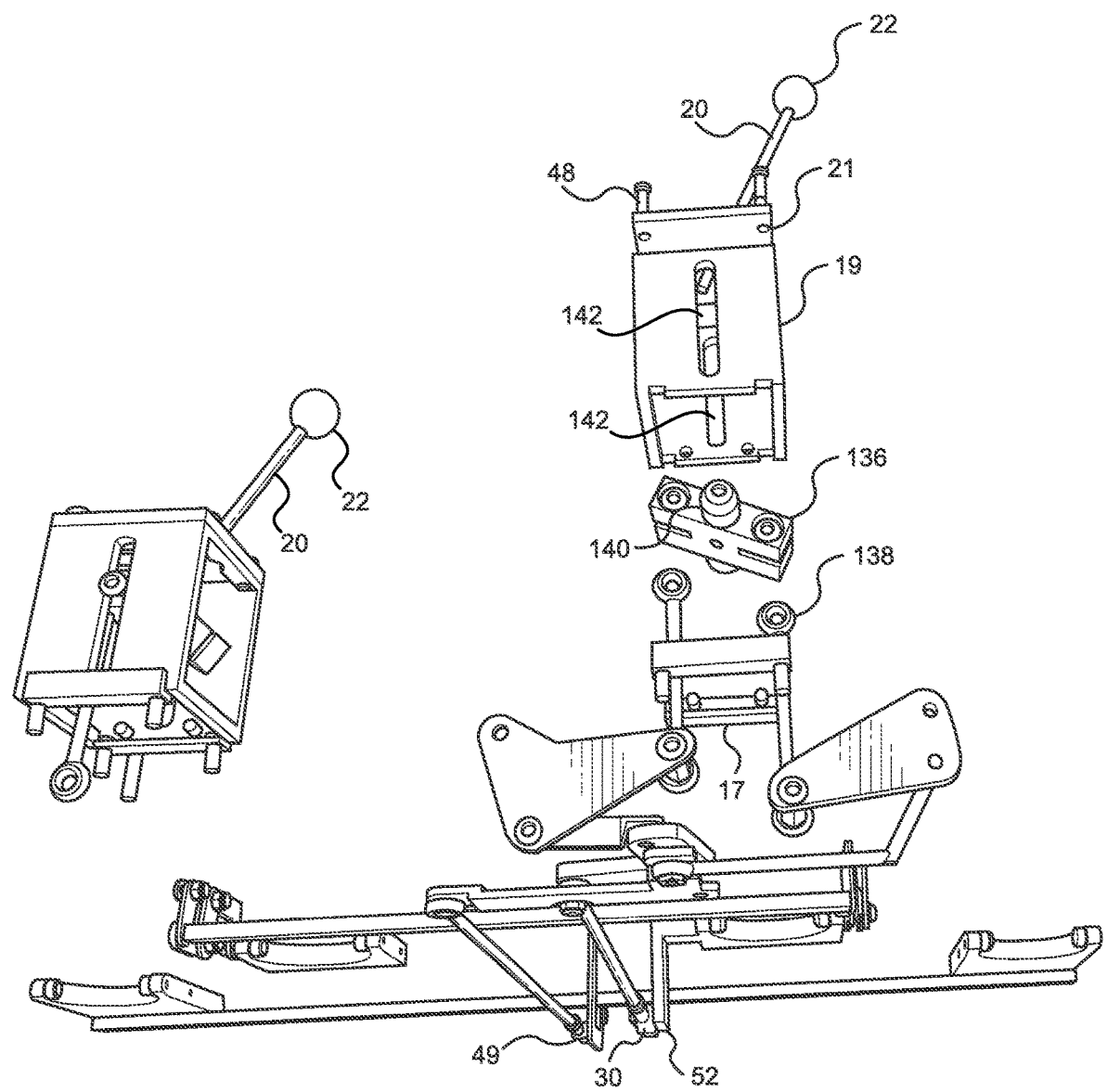
FIG. 14 depicts an exploded view of certain embodiments of the track dolly illustrating a plurality of levers.
Figure 15:
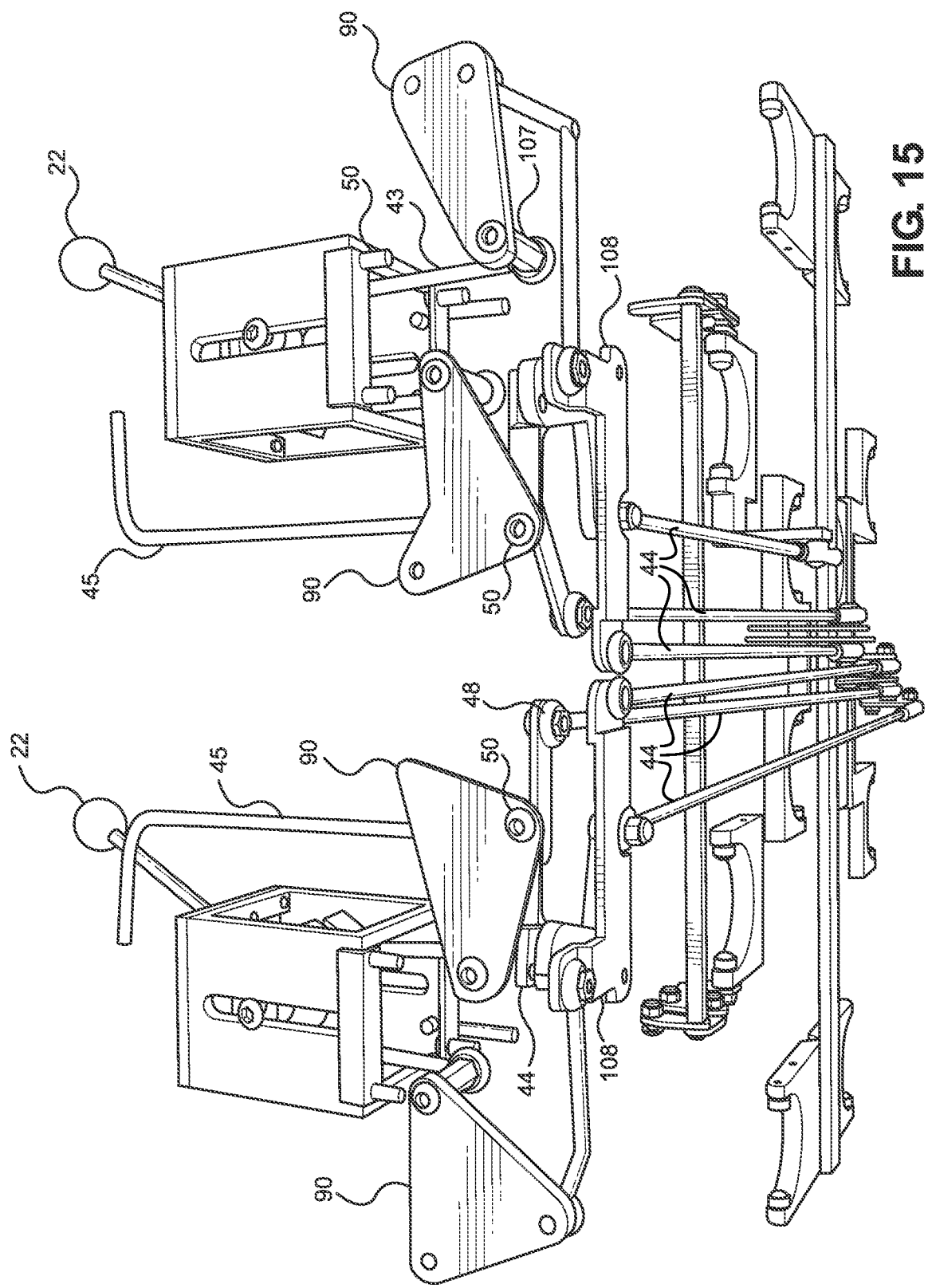
FIG. 15 depicts a perspective view of certain embodiments of the track dolly illustrating the plurality of levers.
Figure 16:
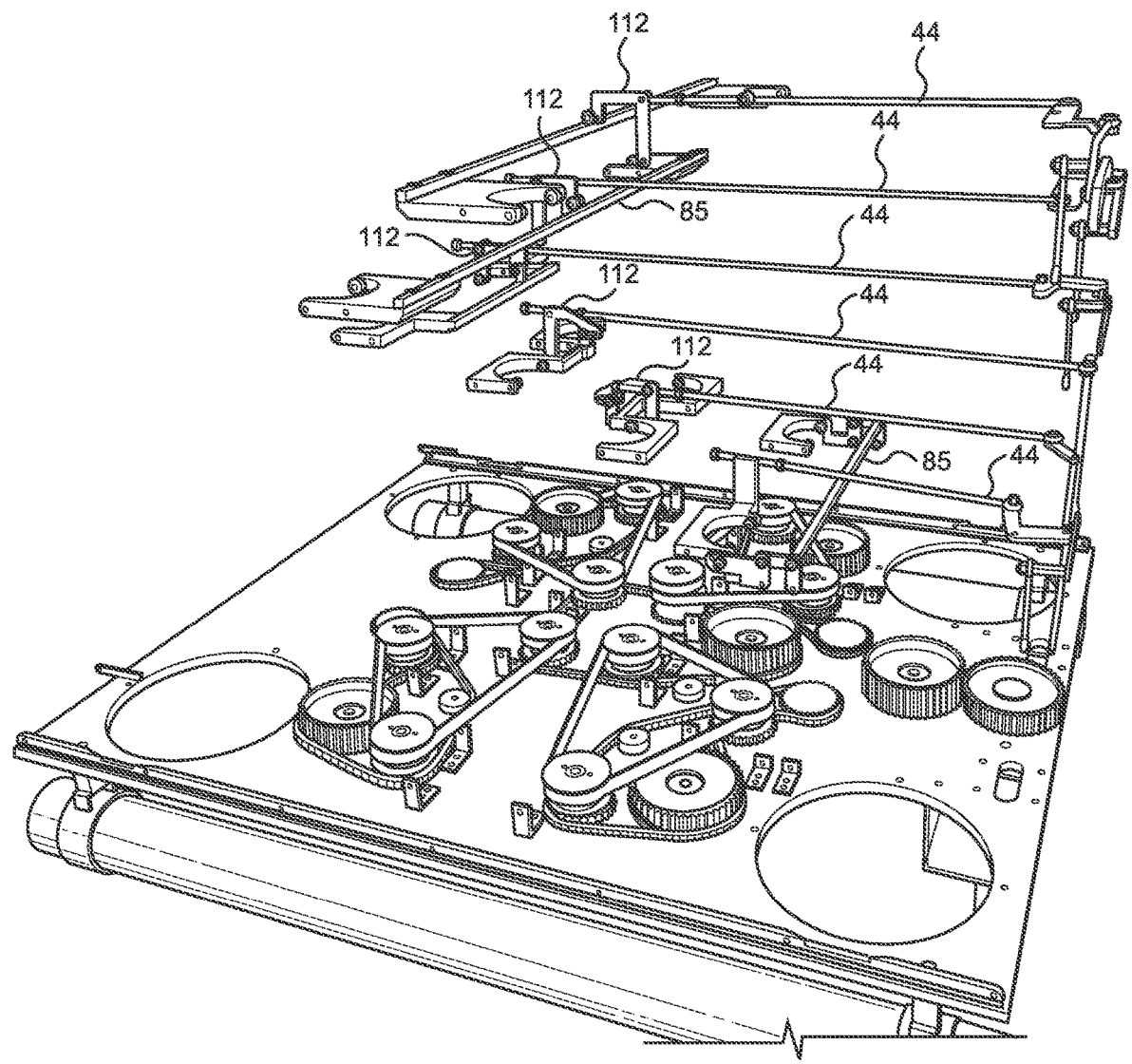
FIG. 16 depicts an exploded view of certain embodiments of the track dolly.

In certain embodiments as depicted in FIGS. 1 and 14-15, each wheel drive assembly lever 20 comprises grip ball 22 and is coupled to lever housing top 21 and housing frame 19. Lever housing top 21 and housing frame 19 are coupled together by screws 48. The bottom end of wheel drive assembly lever 20 is coupled to H-block 136 by any number of mechanical fasteners such as bolts, nuts and the like. H-block 136 is housed within housing frame 19 and comprises a pair of protrusions 140 that slidably adjust along a pair of elongated slots 142 in housing frame 19. H-block 136 is coupled to frame mount linkage arms 138, frame mount 17, vertical support rods 43, coupling 52, wedge 90, spacer 107, L-arm 108 and lever linkage members 44, which may comprise any components including, but not limited to arms, rods, bars, pivot components, L-brackets, angled linkage rods, couplers, and the like.

In certain embodiments as depicted in FIGS. 1 and 14-16, each center drive assembly lever 45 is coupled to wedge 90, other connection components and lever linkage members 44, which may comprise any components including, but not limited to arms, rods, bars, pivot components, L-brackets, angled linkage rods, couplers, and the like.

Figure 17:
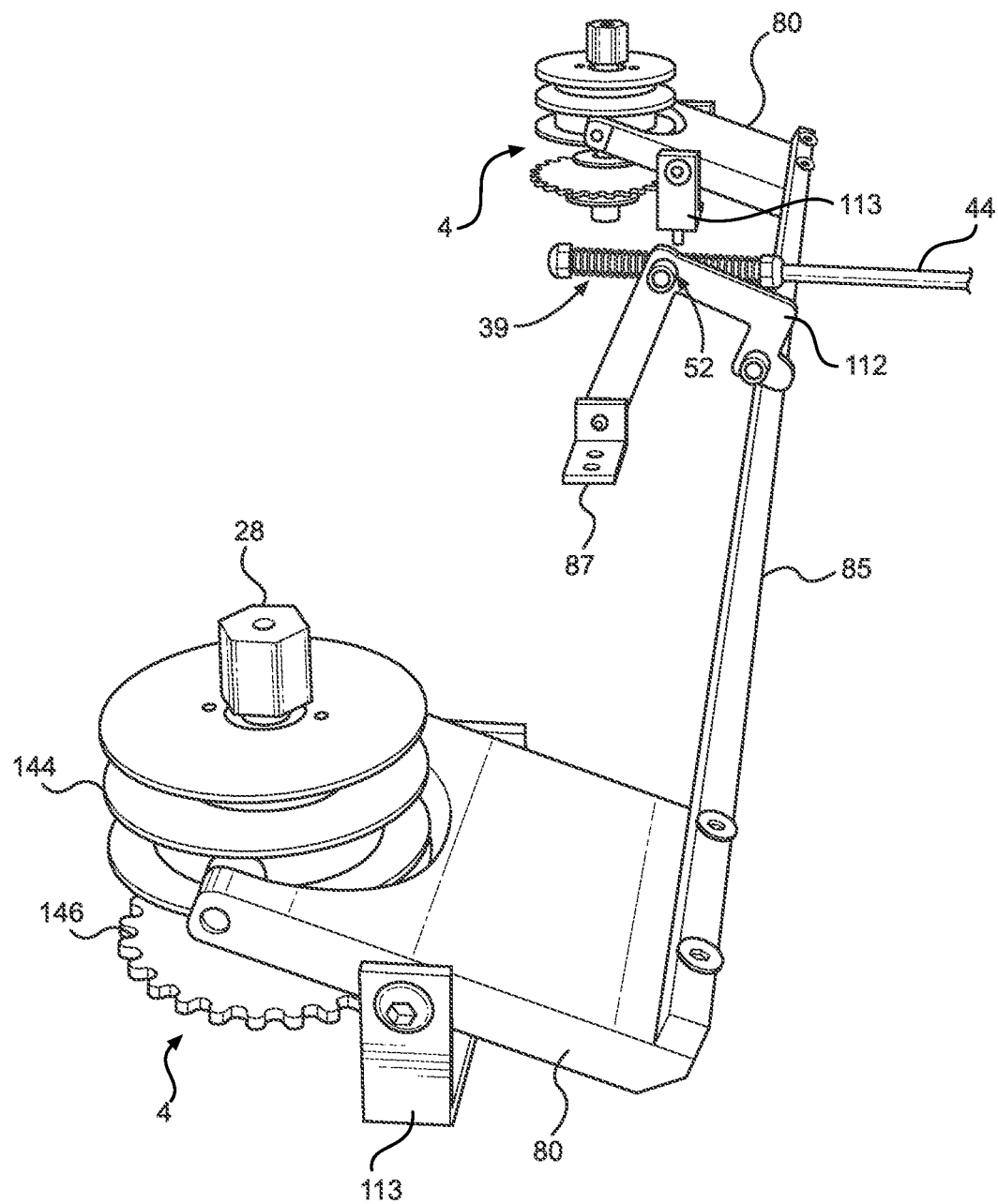
FIG. 17 depicts a perspective view of certain embodiments of the track dolly.

In certain embodiments, wheel drive assembly levers 20 and center drive assembly levers 45 control the engagement and disengagement of their respective connected sprocket gear assemblies 4 in the same manner using the same components and connections. For simplicity, the connection between wheel drive assembly lever 20 and second rear wheel drive assembly pulley levers 80 to control sprocket gear assemblies 4 associated with rear wheel assemblies 54 is illustrated in FIG. 17. In one embodiment, second rear wheel drive assembly pulley levers 80 are connected together by connecting bar 85. Pulley bracket wedge 112 is coupled to plate 12 by L-bracket 87 and mechanical fasteners. Pulley bracket wedge 112 is coupled to the center of connecting bar 85 and spring 39, which is coupled to the end of lever linkage members 44. A pair of U-shaped lever mounts 113 is coupled to plate 12 and second rear wheel drive assembly pulley levers 80. In one embodiment as depicted in FIGS. 8 and 17, bearings 46 permit second rear wheel drive assembly pulley levers 80 to pivot relative to U-shaped lever mounts 113 as needed.

In operation, the movement of wheel drive assembly lever 20 transfers through lever linkage members 44, spring 39 and second rear wheel drive assembly pulley levers 80. This pivots second rear wheel drive assembly pulley levers 80 so that pins 145 of pulleys 144 engage and disengage with sprocket openings 147 of detachable sprockets 146 in sprocket gear assemblies 4.

Figure 5:
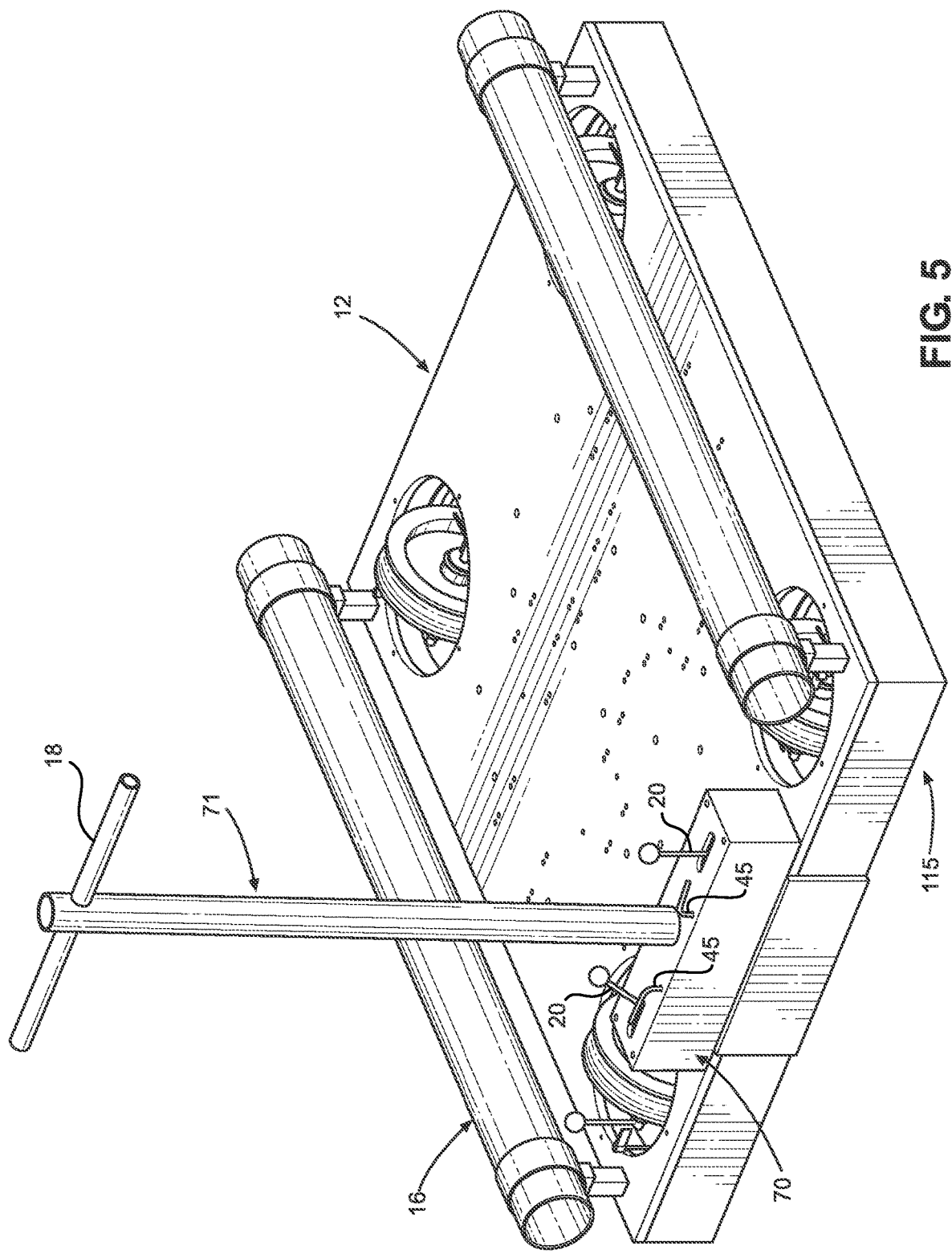
FIG. 5 depicts a perspective view of certain embodiments of the track dolly.
Figure 7:
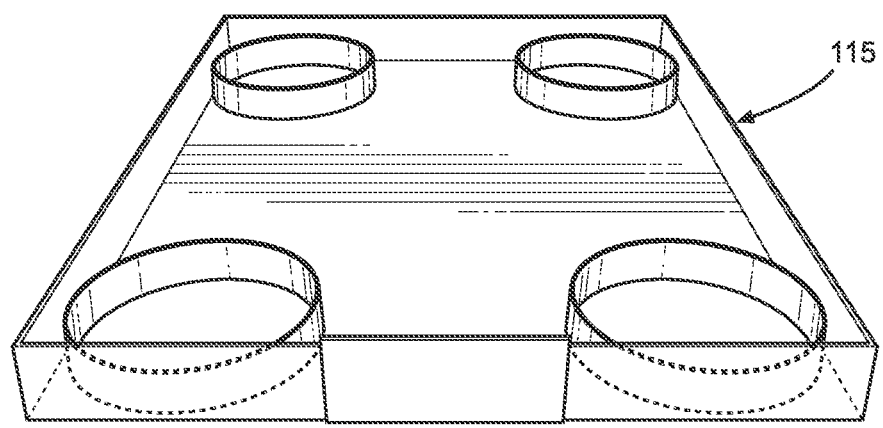
FIG. 7 depicts a perspective view of certain embodiments of the track dolly illustrating a cover.

In one embodiment as depicted in FIGS. 2 and 7, bottom cover 115 is coupled to side support brackets 114 by mechanical fasteners to enclose the components beneath plate 12 including all gears, chains, belts, sprocket gear assemblies, timing gear assemblies, levers, linkage members, and the like. In one embodiment as depicted in FIG. 5, lever box 70 is coupled to the top of plate 12 of track dolly 10 to partially cover wheel drive assembly levers 20 and center drive assembly levers 45.

It shall be appreciated that the components of track dolly 10 described in several embodiments herein may comprise any alternative known materials in the field and be of any color, size and/or dimensions. It shall be appreciated that the components of track dolly 10 described herein may be manufactured and assembled using any known techniques in the field. Gears, components, fasteners and the like of track dolly 10 can be made from any materials including aluminum, steel, other metals or materials.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A track dolly for use to mount a camera and accessories thereon, the track dolly comprising a steering mechanism to enhance directional control of the dolly when in motion, the track dolly comprising:
    a plate comprising a top surface and a bottom surface;
    at least one rail coupled to the plate and configured to permit attachment of the camera or accessories thereto;
    a plurality of wheels rotatably mounted to the plate;
    a handle rotatably mounted to the top surface of the plate; and
    a plurality of linkage members adjustably mounted to the bottom surface of the plate and operably connected to the handle, the plurality of linkage members operably connected to any number of the plurality of wheels;
    wherein the handle is maneuvered to permit the plurality of linkage members to rotatably adjust any number of the plurality of wheels relative to the plate, thereby adjusting the directional control of the dolly;
    wherein the at least one rail comprises a pair of rails coupled to the top surface of the plate along a pair of opposing side edges of the plate;
    wherein each wheel in the plurality of wheels is mounted to a wheel gear that is coupled to the plate;
    wherein the plurality of linkage members comprises a steering gear rotatably mounted to the plate and coupled to the handle, and a center drive assembly operably connected to the steering gear and configured to drive the wheel gear connected to any one of the plurality of wheels;
    wherein the center drive assembly comprises a first timing gear assembly, a center chain and a plurality of center sprocket gear assemblies operably connected together, the first timing gear assembly comprising an upper gear engaged with the steering gear and a lower sprocket coupled to the upper gear and engaged with the center chain, the plurality of center sprocket gear assemblies operably connected to the center chain, each center sprocket gear assembly in the plurality of center sprocket gear assemblies corresponding to one of the plurality of wheels and comprising a pulley coupled to a detachable sprocket, the detachable sprockets of the plurality of center sprocket gear assemblies engaged with the center chain;
    a plurality of wheel drive assemblies operably connected to the center drive assembly, each wheel drive assembly in the plurality of wheel drive assemblies corresponding to one of the plurality of wheels and one of the plurality of center sprocket gear assemblies, the wheel drive assembly comprising a wheel sprocket gear assembly, a belt coupled to the pulley of one of the plurality of center sprocket gear assemblies, a second timing gear assembly and a wheel chain, the wheel sprocket gear assembly comprising a pulley coupled to a detachable sprocket, the pulley of the wheel sprocket gear assembly coupled to the belt and the detachable sprocket of the wheel sprocket gear assembly coupled to the wheel chain, the second timing gear assembly coupled to the wheel chain and engaged with the wheel gear corresponding to one of the plurality of wheels;

wherein rotational movement of the handle is configured to transfer through the steering gear, the first timing gear of the center drive assembly, one of the plurality of center sprocket gear assemblies in the center drive assembly, the wheel sprocket gear assembly and second timing gear assembly in one of the plurality of wheel drive assemblies to drive one of the wheel gears in the plurality of wheel gears, thereby rotatably adjusting the wheel connected to the wheel gear;

a first plurality of levers coupled to the plate and operably connected to any number of the plurality of center sprocket gear assemblies in the center drive assembly, each lever in the first plurality of levers configured to maneuver an engagement and disengagement of the pulley and detachable sprocket in at least one of the plurality of center sprocket gear assemblies;

a second plurality of levers coupled to the plate and operably connected to any number of the plurality of wheel sprocket gear assemblies in the plurality of wheel drive assemblies, each lever in the second plurality of levers configured to maneuver an engagement and disengagement of the pulley and detachable sprocket in at least one of the plurality of wheel sprocket gear assemblies; and a brake coupled to each wheel in the plurality of wheels.

* * * * *